Jan. 17, 1967    R. A. SANFORD    3,299,387
HUMIDITY-SENSITIVE RESISTOR

Filed Dec. 23, 1964                                2 Sheets-Sheet 1

INVENTOR
ROBERT A. SANFORD
BY W. J. Shanley, Jr.
ATTORNEY

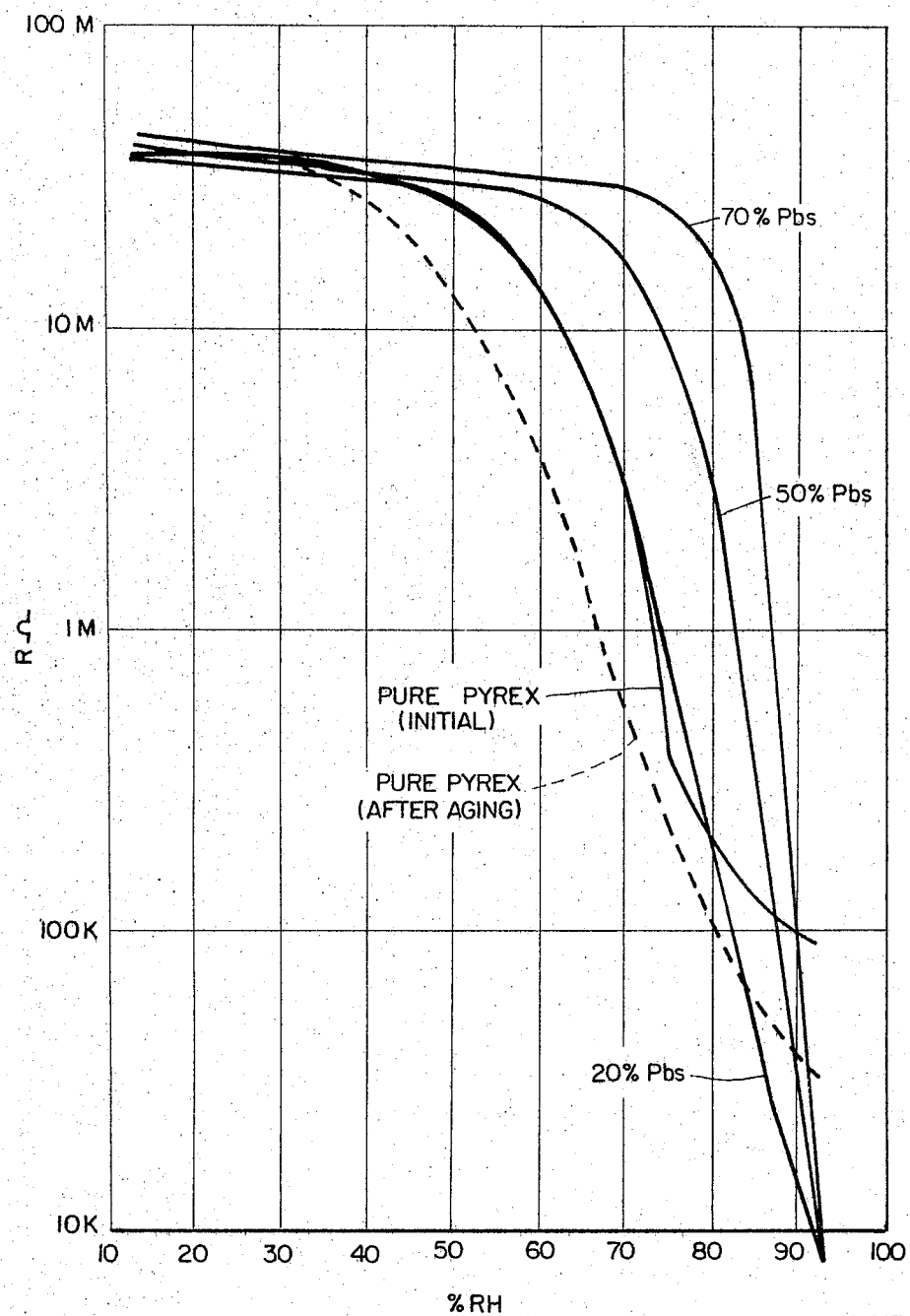

United States Patent Office 3,299,387
Patented Jan. 17, 1967

3,299,387
HUMIDITY-SENSITIVE RESISTOR
Robert A. Sanford, Marblehead, Mass., assignor to General Electric Company, a corporation of New York
Filed Dec. 23, 1964, Ser. No. 420,530
10 Claims. (Cl. 338—35)

This invention relates to a humidity sensor and more particularly to an electrical-response-type, relative-humidity-measuring resistor and a method for making same.

The more common types of humidity-sensitive resistors may be classified on the basis of their basic principles of operation. The first type that depends upon the conductivity of aqueous electrolytic solutions are more commonly known as film sensors. These types of sensors commonly have films applied to impervious insulating surfaces, fibers and fabrics or porous ceramics. Lithium chloride is commonly used for such films. Such sensors are very susceptible to damage and contamination, are large in size, slow in response, and cannot be exposed for an extended period of time to high humidity without a permanent shift in calibration. Furthermore, they cannot be easily regenerated once they have become contaminated.

A second type of humidity sensor is based upon the surface resistivity of impervious solids. These sensors depend upon the water vapor adsorbed on the surface of these materials for forming a leakage path for current flow. These devices have not found wide commercial acceptance since the magnitude of the surface resistivity of acceptable insulators is normally very high. This requires the use of special measuring circuits and techniques which do not lend themselves to commercial devices.

Another type of humidity-sensitive resistor which is analogous to the previously noted type depends upon the volume resistivity of porous solids. Highly porous substances, as, for example, underfired clays, natural fibers and textiles, have a high capacity for moisture absorption. Water vapor diffuses and permeates into the pores of these substances, greatly affecting their volume resistivity. Unfortunately, the porous nature of these materials which makes them so highly hygroscopic often contributes undesirable characteristics that seriously detract from their usefulness as sensors. Response time of such sensors is often excessively long, and they possess hysteresis and drift which seriously detract from their utilization as commercial sensors. Furthermore, they require aging over long periods of time before they can be relied on to give any measure of accuracy. Overcoming this problem is particularly important since the aging of sensors for periods of time of the order of months is highly undesirable. This invention relates to sensors of this basic type which are suitable for commercial utilization since they do not have the previously noted deficiencies of the prior art devices.

It is therefore an object of this invention to provide a new and improved humidity sensor of the volume resistivity type which requires substantially no aging prior to its being utilized.

It is another object of this invention to provide a new and improved humidity sensor of the volume resistivity type which has an extremely fast response time.

It is yet another object of this invention to provide a new and improved humidity sensor of the volume resistivity type which exhibits minimal hysteresis.

It is still a further object of this invention to provide a new and improved humidity sensor which is very small in size and is not permanently affected by imersion in water or exposure for an extended period of time to high humidity.

It is yet another object of this invention to provide a new and improved humidity sensor which provides a substantially linear response over a wide range of humidity variations.

Further objects and advantages of my invention will become apparent as the following description proceeds, and the features of novelty which characterize my invention will be pointed out with particularity in the claims annexed to and forming a part of this specification.

In the drawing:

FIGURE 4 is a graph showing the electrical resistance versus relative humidity of typical resistors prepared in accordance with the present invention.

In accordance with this invention, the characteristics of a ceramic composition are modified to make the material suitable for use in humidity sensors by adding a modifying compound thereto and shaping the body which is formed in a manner so as to provide the previously noted desirable operating characteristics. These sensors require no aging, have a fast response time (in seconds), are not damaged by immersion in water or by extended exposure to high humidity, and their calibration is not affected by exposure to oxygen, hydrogen, or nitrogen. In addition, they have a very low temperature coefficient in the range of 25–100° C. Furthermore, they are unaffected by exposure to mineral acid or alkaline atmospheres unless actually wetted by these agents. The term "ceramic" as hereinafter utilized is intended to include "glass."

A humidity-sensitive resistor, in accordance with my invention, may be made by modifying a glass having humidity-sensitive properties, e.g., Pyrex–7740 sold by Corning Glass Company, with a compound which will modify the properties of the glass so as to make it suitable for use in commercial humidity sensors. This modification is necessary since pure Pyrex–7740 glass requires a long period of cycling before stable characteristics are obtained, e.g., two months. Furthermore, the response curve of pure Pyrex is not linear enough over a wide enough range of relative humidity to permit its commercial utilization. An extremely fast response may be obtained by shaping the body of modified glass so that the external surface area exposed to the atmosphere is made large relative to the total volume of the sensor. Hysteresis may also be kept at a minimum by making the humidity-sensitive body as thin as possible, thus minimizing the total mass of the body.

The following example will serve to illustrate more fully this invention:

EXAMPLE 1

Figure 1:
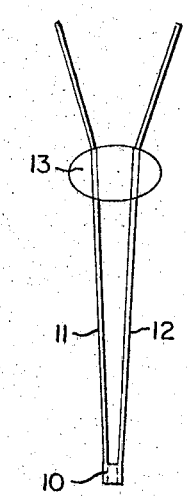
FIGURE 1 illustrates a humidity-sensitive resistor prepared in accordance with the present invention.
Figure 2:
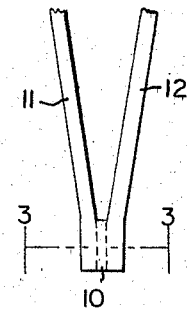
FIGURE 2 is an enlarged view of the sensor area of the resistor of FIGURE 1.

Powdered Pyrex–7740 glass (270–325 mesh) is mixed in a ball mill for two hours with powdered PbS in the proportions 80–20% by weight. Then a water slurry using distilled water is prepared. Referring now to FIGURE 1, body 10 is formed by applying this slurry to fill the space between two confronting .020 inch platinum electrodes 11 and 12, the lower portions of which are held in spaced parallel alignment during this operation due to the mechanical support provided by glass bead 13. The spacing between the electrodes is made as small as possible without having shorts develop during this operation, e.g., a few mils.

Figure 3:
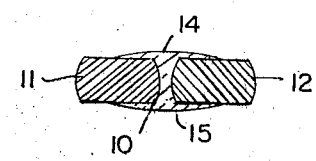
FIGURE 3 is a cross-sectional view taken along lines 3—3 of FIGURE 2.

A better mechanical bond between the glass body 10 and cylindrical electrodes 11 and 12 is provided by abrading them at the point where the slurry is applied so that they assume the elliptical shape illustrated in FIGURE 3. This also serves to reduce the overall mass of body 10 by making it as thin as mechanically possible so as to minimize hysteresis. In practice, the electrodes are abraded in this area with sandpaper (AB Abrasive Belt, grit 120, manufactured by Buehler Limited) until the electrode thickness is reduced to .010 inch. Platinum was selected over other chemically inert noble metals for the reason that it has substantially the same coefficient of thermal expansion as does Pyrex glass. This results in providing a thermal shock-resistant sensor having a strong bond between the electrodes and the glass body even under conditions of high thermal shock. Supporting bead 13 has no discernible effect upon sensor characteristics because of the extremely high resistance of the path through this bead between electrodes. Furthermore, since the glaze is not removed from its surface, it will absorb very little moisture.

The moisture is then removed from the resulting assembly without melting the powders of the mixture by placing the assembly in an oven where it is heated to approximately 200° C. for one-half hour. This step is important to overcome large nonuniform voids which would otherwise occur if the moisture were not removed prior to the firing operation.

The assembly is then fired at a temperature sufficient to melt the powders for a length of time sufficient to provide a body of substantially uniform porosity. It has been found that this will occur if heated to 800–900° C. for approximately one hour. The assembly is then cooled and abraded on both sides with the same type of sandpaper as was previously used upon the electrodes so that surfaces 14 and 15 will assume the shape illustrated in FIGURE 3. This operation serves to remove the glazed surfaces from the ceramic body so as to expose the underlying pores, and, in addition, it serves to permit the control of the final shape of the sensor body to minimize mass.

The exact nature of the relationship between the modifying compound and the glass is not known. It is not apparent whether it is a dispersion or a solid solution. However, it is clear that, in accordance with my invention, the modifying compound is distributed in a homogeneous manner throughout the glass rather than being adsorbed onto the glass, which is the case in the prior art sensors which are impregnated by immersion into various salt solutions.

The advantages of this composition-of-matter type sensor over a film-type sensor are:

(1) The characteristics of the sensor can be controlled by adjusting the proportions of the components.

(2) No aging is required.

(3) The homogenous distribution of the modifying compound throughout the volume of the sensor allows for the regeneration of a fresh surface in a simple cleaning operation if a surface becomes contaminated.

(4) The sensor is not permanent affected by immersion in water, moisture condensation, or extended exposure to high humidity after being dried by the application of heat for a few seconds.

(5) These types of sensors may be made very small in size, thus permitting their application where size is a critical factor.

(6) These types of sensors can be constructed inexpensively in a variety of different shapes as dictated by the operational characteristics desired, e.g., fast response low hysteresis.

OTHER EXAMPLES

Ceramic bodies were prepared in accordance with the procedures set forth in Example 1 above except that the following modifying compounds, among many others, were mixed in varying percentages with the powdered Pyrex glass:

CdS
PbSe
PbTe

The resulting sensors have many desirable characteristics of the types previously mentioned which make them eminently suitable for use as commercial sensors. However, the sensor created by the process of Example 1 is the preferred sensor because of its excellent all-around characteristics.

Referring now to FIGURE 4, there are illustrated the response curves for Pyrex–7740 sensors of the configuration of FIGURE 1 with varying percentages of PbS. These curves were plotted from measurements made in an A.-C. powered resistance bridge. The pure Pyrex curves illustrate not only that pure Pyrex–7740 glass is humidity sensitive to a certain extent but also that it requires a long period of cycling before stable characteristics can be obtained. Initially, the calibration curve is highly nonlinear, but after two months of cycling tests, the curve becomes more nearly linear over a moderate range of humidity values.

The curves illustrated in FIGURE 4 for sensors having varying percentages of PbS are plots of the characteristics of these sensors after only twenty-four hours' aging in which the sensor is cycled through one complete cycle. After this period the sensor characteristics are stable. This is to be compared with aging periods of up to a month with prior art sensors. It can also be seen that increasing the PbS concentration results in the sensor's having a decreased range of operation but a greater sensitivity within that range. This phenomenon permits the controlling sensor characteristics with regard to range and sensitivity.

The response time of a 20% PbS modified sensor of the configuration of FIGURE 1 averages about 5 seconds for 90% of the resistance change in the humidity range 50–85% R.H. with a flow rate of 1–2 liters/minute. This response time is a considerable improvement over the response times of prior art sensors.

The sensor shape was also found to be very important as far as controlling the range, sensitivity, hysteresis, and response time. In addition to the illustrated "pencil point" configuration, other configurations were studied to determine optimum configuration. For example, ⅛ inch x ⅛ inch platinum gauze electrodes were arranged in confronting relationship with an interposed thin stratum of sensing material. This provided a sensor having a much more limited range and much slower response (5–10 minutes) than the configuration of FIGURE 1.

In addition, a "narrow" configuration in which .020 inch lead ends were flattened to a width of .060 inch and placed in confronting relationship with a thin stratum of sensing material in between. This type of sensor configuration evidenced a very large hysteresis effect and very slow response time between of the large volume relative to the exposed surface. Another configuration that was tested may be identified as the "wide area" type in which .020 inch platinum leads which were flattened to .060 inch were placed side by side so as to provide an area approximately .120 inch wide. A thin stratum of sensing material was then applied over both electrodes. This configuration provided a sensor of increased conductivity, very low sensitivity, and high hysteresis.

It was thus concluded that the illustrated "pencil point" configuration appears to be best in terms of sensitivity, hysteresis, and speed of response over the range from 40–100% R.H.

It has been found that the frequency of the signal applied to the "pencil point" configuration has a considerable effect upon the range of resistance values it will present in the 40–100% R.H. range. These curves indicate that optimum range occurs at lower frequencies, preferably below 5,000 cycles per second. In addition, it has been found that the magnitude of the applied voltage also affects the sensitivity and linearity. Optimum sensitivity appears to be obtained with the applied voltage in the 2–3 volt range while the most nearly linear operation takes place at approximately 44 volts. The only disadvantage when operating at this voltage is a slower speed of response.

The temperature effect on each of the PbS sensors is small from approximately 25° C. up to 100° C. Thus, no temperature compensation will be needed in this range.

It will be understood, of course, that it is not wished to be limited thereto since many modifications may be made, and it is therefore contemplated by the appended claims to cover all modifications within the true spirit and scope of my invention.

What I claim as new and desire to secure by Letters Patent of the United States is:

1. A humidity-sensitive resistor comprising:
 (a) a porous ceramic body having a porous surface and a modifying compound from the group consisting of lead sulfide, lead selenide and lead telluride, said compound distributed homogeneously throughout said ceramic body, and
 (b) first and second electrodes electrically connected to said porous ceramic body.

2. The combination of claim 1 wherein said first and second electrodes are closely spaced and chemically inert.

3. The combination of claim 2 in which said porous ceramic body comprises glass and said electrodes comprise a noble metal having substantially the same coefficient of thermal expansion as said glass.

4. The combination of claim 3 in which said modifying compound comprises PbS, which constitutes 20% by weight of the total body weight, and said glass comprises a Pyrex glass.

5. The combination of claim 2 in which said electrodes are in spaced, parallel alignment, said electrodes having confronting surfaces in contact with said porous ceramic body, said surfaces and said porous ceramic body being shaped so that said porous ceramic body has a large exposed surface-to-volume ratio and a minimum volume.

6. The combination of claim 5 in which the portions of said electrodes in contact with said body are shaped so that their dimensions in directions perpendicular to the interelectrode spacing are minimized so that the thickness of said body is minimized, said interelectrode spacing being minimized to thereby minimize the volume and resistance of said body.

7. The combination of claim 6 in which the portions of said electrodes in contact with said body are generally ellipsoidal in shape and are in closely spaced, parallel alignment with the major axis of both electrodes lying in the same plane, said body substantially filling the space between said electrodes.

8. The combination of claim 7 in which the remaining portions of said electrodes diverge as they leave said body, said diverging portions of said electrodes being cylindrical in shape and of a minimum size consistent with acceptable mechanical strength, the diameters of said electrodes being large with respect to said interelectrode spacing.

9. The combination of claim 8 further comprising means for mechanically interconnecting said diverging portions of said electrodes, the electrical resistance of said interconnecting means being at least an order of magnitude larger than the resistance of said body between electrodes at the lowest humidity levels to which it will respond.

10. A humidity-sensitive resistor comprising:
 (a) a porous ceramic material having a porous surface, said material comprising the product of firing a homogeneous mixture of:
  (1) a mineral capable of forming a porous ceramic body when fired and
  (2) a compound from the group consisting of lead sulfide, lead selenide and lead telluride, and
 (b) first and second electrodes electrically connected to said porous ceramic.

References Cited by the Examiner
UNITED STATES PATENTS

| | | | |
|---|---|---|---|
| 2,806,991 | 9/1957 | White | 338—34 X |
| 2,809,134 | 10/1957 | McIlvaine | 252—518 X |
| 2,930,999 | 3/1960 | Van Santen et al. | 338—15 |
| 3,013,232 | 12/1961 | Lubin | 338—15 X |
| 3,058,079 | 10/1962 | Jones | 338—35 |
| 3,208,022 | 9/1965 | Shivonen et al. | 338—15 |
| 3,220,881 | 11/1965 | Yando | 252—518 X |
| 3,221,393 | 12/1965 | Sapoff et al. | 338—22 X |

References Cited by the Applicant

| | | |
|---|---|---|
| 2,358,406 | 9/1944 | Lichtgarn. |
| 2,381,299 | 8/1945 | McCulloch. |
| 2,862,090 | 11/1958 | Mayer. |
| 2,876,321 | 3/1959 | Amdur et al. |
| 2,886,682 | 3/1959 | Martin. |

RICHARD M. WOOD, *Primary Examiner.*

W. D. BROOKS, *Assistant Examiner.*